Inventor:
Paul Lüscher
by: J. [signature]
Attorney

Nov. 15, 1960 P. LÜSCHER 2,960,637

RECTIFYING FILTER FOR A TELEPHONE FEE METER OPERATING THROUGH PULSES AT A FREQUENCY OF 16 KILOCYCLES

Filed Jan. 15, 1958 2 Sheets-Sheet 2

Inventor:
Paul Lüscher
by J. Delattre-Seguy
Attorney

United States Patent Office 2,960,637

Patented Nov. 15, 1960

2,960,637

RECTIFYING FILTER FOR A TELEPHONE FEE METER OPERATING THROUGH PULSES AT A FREQUENCY OF 16 KILOCYCLES

Paul Lüscher, Geneva, Switzerland, assignor to Sodeco Societe des Compteurs de Geneve, Geneva, Switzerland, a firm of Switzerland Filed Jan. 15, 1958, Ser. No. 709,137

Claims priority, application Switzerland Jan. 22, 1957

12 Claims. (Cl. 317—147)

Figure 1:
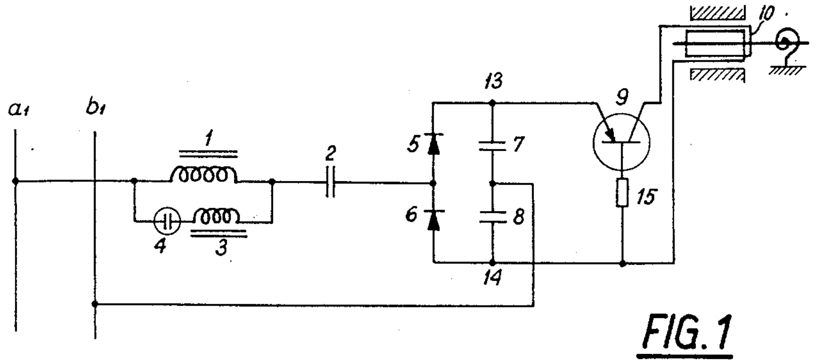

The recording of call fees in automatic telephone systems is provided through pulses of alternating current transmitted by the exchange and recorded at the subscriber's by a fee meter. The frequency used for this purpose was equal some time ago to 50 cycles. Nowadays, the frequency of 16 kilocycles is preferred, which frequency requires however certain precautions so as to prevent the pulses from reaching the subscriber's listening circuit.

Generally speaking, this result is obtained by connecting between the exchange and the subscriber's telephone equipped with such a fee meter, a low pass filter operating in the direction leading from the exchange towards the subscriber, said filter being adapted to stop the fee pulses of 16 kilocycles, while it allows the passage of the audible frequencies, only the fee pulses of 16 kilocycles being allowed to pass in the other direction.

Fee pulse meters for 16 kilocycle pulses are also known wherein the member controlling the indicator elements is constituted by a winding revolving inside the field of a permanent magnet. At the moment of the passage of the pulse, the winding is shifted away from its inoperative position into which it is returned by a spring after the passage of said pulse. During the return movement of the winding, the fee indicator operates as a generator. If, during this movement, the winding is connected across the terminals of a comparatively low resistance, or is short-circuited, its return into its inoperative position is considerably braked. Said braking may be such that the winding has not yet reached its inoperative position when the following fee pulse passes through it, which may lead to highly objectionable mistakes in the addition or integration of said pulses.

To obtain the direct current required for the operation of the meter, the alternating current forming the pulses should be rectified. A rectifying filter has already been proposed which includes a diode inserted in a resonant circuit tuned to the frequency of 16 kilocycles and inserted in series with the movable winding of the fee meter. During the operation of the meter, said winding is short-circuited by the diode, which leads to a considerable braking of its return movement.

The rectifying filter according to my invention has for its object to cut out said braking in a meter fed with telephone fee pulses at a frequency of 16 kilocycles, in which meter the movable member is constituted by a winding revolving inside the magnetic field of a permanent magnet.

According to the present invention, the filter includes a resonant circuit tuned to 16 kilocycles and a rectifier adapted to rectify said pulses so that they may act on the winding only for one direction of rotation of the latter, said circuit and rectifier being associated with an electric valve which allows said winding to be fed only by rectified pulses and which locks the circuit of the winding against operation at the moment at which the latter returns into its original position.

The filter according to my invention may also be provided with means for automatically limiting the current passing through the movable winding, with a view to preventing said winding from being fed by comparatively intense currents, which might lead to damage whenever the distance between the exchange and the meter is comparatively short and leads to an increase in current intensity.

The accompanying drawings illustrate by way of example and by no means in a limting sense, a preferred embodiment of my invention.

Figs. 1, 2, 3, 4 and 5 are wiring diagrams of five different embodiments of said invention.

Fig. 1 shows a filter including a resonant circuit constituted by an induction coil 1 and a condenser 2 inserted in series with said coil. In parallel with the induction coil 1 is inserted a shunt arrangement for limiting the intensity of the current. Said arrangement includes an induction coil 3 and a gas-filled tube 4 inserted in series therewith. The filter includes furthermore a rectifier for rectifying the incoming fee pulses at a frequency of 16 kilocycles. Said rectifier includes two diodes 5 and 6 and two condensers 7 and 8 and it is designed so as to form a voltage doubling circuit.

In the circuit of said rectifier is inserted a transistor 9 forming an electric valve the collector of which is in series with the winding 10. Said transistor 9 is connected so as to have its base in common with its associated circuits.

Figure 2:
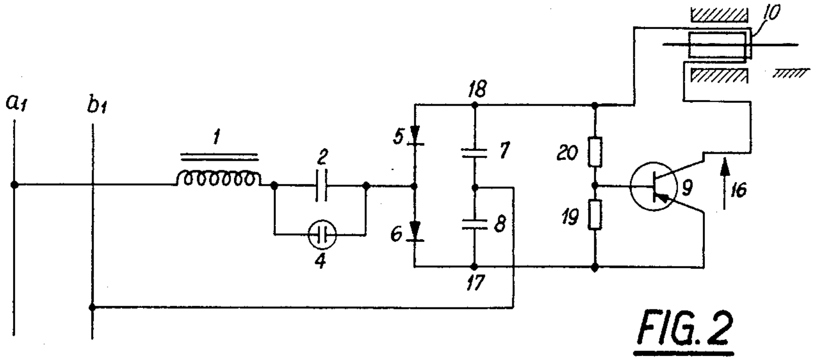

In the filter illustrated in Fig. 2, the resonant circuit is also constituted by an induction coil 1 and by a condenser 2 connected in series. The intensity-limiting means are constituted by a gas-filled tube 4 inserted in parallel with the condenser 2. Said arrangement may be modified to conform with the current-limiting means of the filter illustrated in Fig. 1. The filter illustrated in Fig. 2 also includes a rectifier constituted by two diodes 5 and 6 and two condensers 7 and 8 associated with a transistor 9 having a collector inserted in common. The movable winding 10 of the fee meter is inserted in the collector circuit of the transistor 9.

Figure 3:
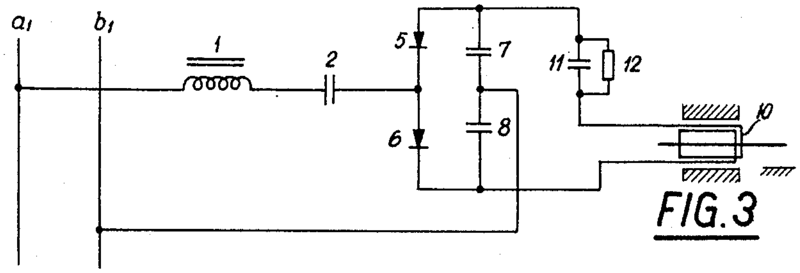

The embodiment illustrated in Fig. 3 includes also an induction coil 1, a condenser 2, a rectifier including two diodes 5 and 6 and two condensers 7 and 8; the electric valve of said filter includes an RC circuit including a condenser 11 inserted in parallel with a resistance 12, said condenser 11 and resistance 12 being inserted in series with the movable winding 10. In this third embodiment, no current limiting means have been illustrated but, obviously, such means could be incorporated therewith.

Figure 4:
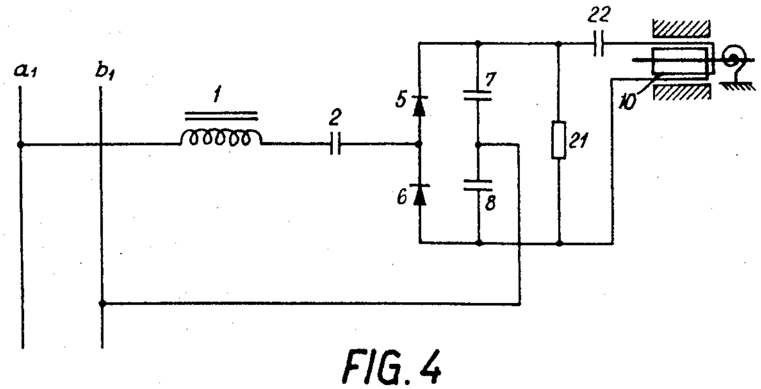

In the filter illustrated in Fig. 4 are shown the elements 1, 2, 5, 6, 7 and 8 which are provided and connected as precedingly, but the braking of the return movement of the movable winding 10 is reduced through a differential system including a condenser 22 and the movable winding 10 itself, across which winding and condenser is inserted a resistance 21.

Figure 5:
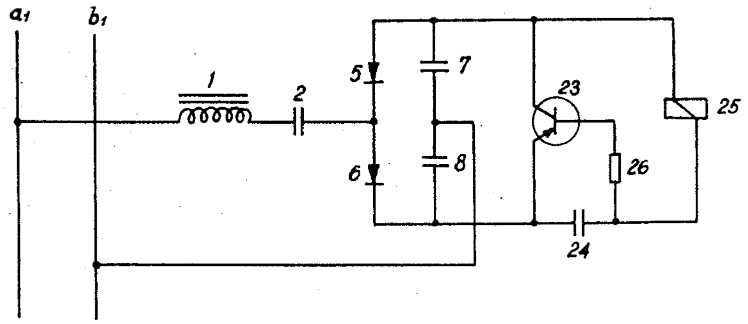

The filter illustrated in Fig. 5 is very similar to that illustrated in Fig. 4, since in said filter the braking exerted on the winding 25 is also reduced through differential means equivalent to those illustrated in Fig. 4, with the substitution however for the resistance 21 of a transistor 23 and of an induction coil 26 connecting its base with a point between the winding 25 and the condenser 24.

The filter illustrated in Fig. 1 operates in the following manner: as long as the tube 4 is not ignited, the resonant circuit is tuned to the 16 kilocycle frequency. When a fee pulse reaches the filter, it is rectified by the rectifying system 5—6 which doubles its voltage. The point 13 shows then with reference to the point 14 a positive voltage and, consequently, the input impedance of the transistor 9 is positively biased. This bias produces a base current passing through the resistance 15. The collector of the transistor 9 is then negatively biased with reference to its base, and this leads to the production of a current in the direction 16, through the circuit including the winding 10, said current passing through the input impedance and the collector of the transistor 9. The latter allows the rectified pulse to pass and the winding 10 is shifted away from its inoperative position.

At the moment at which said pulse ceases, the points 13 and 14 return to the same voltage and the bias on the input impedance of the transistor is reduced to zero. The winding 10 returns into its starting position under the action of a spring. This return movement produces the induction of a voltage across the terminals of the winding 10. However, since the input impedance of the transistor is not biased positively with reference to its base, no current can pass through the said input impedance and the induced voltage is inoperative. No current passes through the winding 10 and the return movement of the winding is not braked.

As long as the gas-filled tube 4 is not ignited, the impedance of the resonant circuit is defined solely by the winding 1 and the capacity 2. When the fee indicator is at a remote distance from the exchange, the voltage generated in the windings 1 and 3 is too low to provide for ignition of the tube 4 and the filter remains tuned to 16 kilocycles so that the movable winding 10 is fed with a maximum amount of energy. When the fee meter is very near the exchange, on the contrary, the voltage produced is sufficient for ignition of the tube 4. This ignition provides a detuning of the resonant circuit of the filter which transmits to the movable winding only a limited amount of energy.

The operation of the current-limiting means of the filter illustrated in Fig. 2 is similar to that disclosed with reference to Fig. 1. The sole difference resides in the fact that the detuning of the resonant circuit is produced by the sole tube 4 connected in parallel across the condenser 2.

In said filter, the rectifying of a fee pulse raises the voltage at the point 17 with reference to that at the point 18 and, through the agency of the voltage divider 19—20, the input impedance and the collector of the transistor are biased respectively positively and negatively with reference to the base. A current 16 flows through the winding 10 which is shifted away from its inoperative position. At the exact moment at which the pulse ends, the points 17 and 18 return to equal potentials and the bias on the input impedance of the transistor returns to zero. The transistor 9 operates again as an electric valve which prevents the voltage induced across the terminals of the winding 10 from producing a current through the latter during the return of said winding into its starting position. Thus, the braking of the return movement of said winding is cut out.

In the filter illustrated in Fig. 3, a fraction of the rectified fee pulses loads the condenser 11. There appears across the terminals of the latter a voltage which is in phase opposition with the voltage induced in the winding 10 during its return movement. Consequently, the winding 10 is not fed with any current except perhaps for a current of a very low intensity which produces only a very small braking torque.

In the filter illustrated in Fig. 4, the condenser 22 forms with the winding 10 a system in which the fee pulses are differentiated. The front edge of the rectified pulse produces a positive surge which urges the movable winding away from its inoperative position, while the rear edge of said rectified pulse produces an instantaneous voltage opposed to that induced in the winding 10. If the former voltage then obtained is higher than the latter, this results in a current accelerating the return movement of the winding. The resistance 21 produces a rapid discharge of the condensers 7 and 8 after the fee pulse has disappeared and this leads to a sufficient slope for the front and rear edges of the rectified pulse. A suitable selection of the elements 10, 21 and 22 allows, in fact, cutting out the spring returning the winding 10 into its inoperative position.

In the filter illustrated in Fig. 5, there is also produced in the same manner as for the filter illustrated in Fig. 4 a negative pulse adapted to reduce the braking of the winding 10. The differentiation is obtained in the filter of Fig. 5 through the agency of a system including a condenser 24 and a winding 10. The resistance 21 of Fig. 4 is replaced by a transistor 23 connected with a resistance 26. A suitable selection of the resistance 26 provides for the transistor 23 to show a large impedance in the direction leading from the input impedance towards the collector during the loading of the condensers 7 and 8 while said impedance becomes small upon disappearance of the impulse. It is obviously possible to provide with this filter for a return of the winding 25 through a negative pulse, as in the case of Fig. 4, so as to cut out the necessity of a winding returning spring.

What I claim is:

1. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles, and inserted in the means feeding the pulses to the rotary winding, a rectifier system adapted to rectify the pulses fed through the resonant circuit into the rotary winding, means urging the rotary winding in a direction opposed to the predetermined direction, and means inserted between the rectifier system and the winding and preventing any return flow of current from the rotary winding towards the rectifier at the end of each pulse.

2. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter, comprising a resonant circuit tuned to 16 kilocycles and inserted in the means feeding the pulses to the rotary winding, a rectifier system adapted to rectify the pulses fed through the resonant circuit into the rotary winding, and means inserted between the rectifier system and the rotary winding and opposing the current generated at the end of each pulse in said winding, to prevent the flux produced by said current from urging the rotary winding in said predetermined direction.

3. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, means returning the winding into its inoperative position at the end of each pulse and a transistor inserted between the rectifier system and the rotary winding and connected to allow the passage of impulses into the winding and to oppose the passage of current generated by the return movement of the winding at the end of each pulse.

4. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, means returning the winding into its inoperative position at the end of each pulse and a transistor having its base and input resistance connected in series with the rectifier system and its base and collector connected in series with the rotary winding to allow the passage of impulses into the winding and to oppose the passage of current generated by the return movement of the winding at the end of each pulse.

5. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, means returning the winding into its inoperative position at the end of each pulse and a transistor having its base thereof and the collector inserted in series between the winding and the rectifier system and its base and input resistance in series with the rectifier system to allow the passage of impulses into the winding and to oppose the passage of current generated by the return movement of the winding at the end of each pulse.

6. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles, and inserted in the means feeding the pulses to the rotary winding, a rectifier system adapted to rectify the pulses fed through the resonant circuit into the rotary winding, means urging the winding into its inoperative position at the end of each pulse, a condenser inserted between the rectifier system and the winding and a resistance connected across the terminals of the condenser, last-mentioned condenser discharging at the end of each impulse to oppose the current generated in the impulse winding at said end of each pulse.

7. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles, and inserted in the means feeding the pulses to the rotary winding, a rectifier system adapted to rectify the pulses fed through the resonant circuit into the rotary winding, means urging the winding into its inoperative position at the end of each pulse, a condenser inserted in series between the rotary winding and the rectifier system, a resistance inserted in parallel across the condenser and winding and further condensers inserted in the rectifier system, last-mentioned condensers dicharging at the end of each impulse to oppose the current generated in the impulse winding at said end of each pulse.

8. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, means urging the winding into its inoperative position at the end of each pulse, a condenser inserted in series between the rotary winding and the rectifier system, a transistor having its input resistance and collector inserted in parallel across the said condenser and winding, an impedance connecting the base of the transistor with the terminal of the condenser connected with the winding and further condensers inserted in the rectifier system, last-mentioned condensers discharging at the end of each impulse to oppose the current generated in the impulse winding at said end of each pulse.

9. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, and means inserted between the rectifier system and the rotary winding and opposing at the end of each pulse the flow of current generated in said winding, said last-mentioned means urging the latter in said predetermined direction, and means for limiting the intensity of the current flowing through the resonant circuit towards the rotary winding.

10. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, a rectifier system adapted to rectify the pulses fed through the resonant circuit into the rotary winding, means inserted between the rectifier system and the rotary winding and opposing at the end of each pulse the flow of current generated in said winding, said last-mentioned means urging the latter in said predetermined direction, means for limiting the intensity of the current flowing through the resonant circuit towards the rotary winding and including means for detuning the resonant circuit whenever the amplitude of the fee pulses rises beyond a predetermined value.

11. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, said resonant circuit including an induction coil and a condenser, a gas-filled tube and a further induction coil inserted in series with each other and in parallel with the first-mentioned induction coil to detune the resonant circuit whenever the amplitude of the pulses is shifted outside a predetermined range, a rectifier system adapted to rectify the pulses fed through the resonant circuit into the rotary winding, means urging the rotary winding in a direction opposed to the predetermined direction, and means inserted between the rectifier system and the winding and preventing any return flow of current from the rotary winding towards the rectifier system at the end of each pulse.

12. In combination with a telephone fee meter comprising a permanent magnet, a rotary winding revolubly mounted in the field of said magnet and means for feeding said rotary winding with pulses at a frequency of 16 kilocycles to make said winding rotate in a predetermined direction, the provision of a rectifying filter comprising a resonant circuit tuned to 16 kilocycles and inserted in the means feeding the pulses to the rotary winding, said resonant circuit including an induction coil and a condenser, a gas-filled tube connected in parallel with last-mentioned condenser and adjusted to detune the resonant circuit whenever the amplitude of the fee pulses is shifted outside a predetermined range, a rectifier system adapted to rectify the pulses fed through the resonant circuit into the rotary winding, means urging the rotary winding in a direction opposed to the predetermined direction, and means inserted between the rectifier system and the winding and preventing any return flow of current from the rotary winding towards the rectifier system at the end of each pulse.

References Cited in the file of this patent

UNITED STATES PATENTS

| | | |
|---|---|---|
| 2,098,819 | Allison | Nov. 9, 1937 |
| 2,276,669 | Pullis | Mar. 17, 1942 |
| 2,398,366 | Emley | Apr. 16, 1946 |
| 2,542,638 | Desch | Feb. 20, 1951 |